United States Patent
Andersson

(10) Patent No.: US 6,870,462 B1
(45) Date of Patent: Mar. 22, 2005

(54) REMOTELY CONTROLLED POWER SUPPLY IN AN ELECTRONIC LABEL

(76) Inventor: Lars Andersson, Blomguian 10A, Uppsala (SE), S-75231

( * ) Notice: Subject to any disclaimer, the term of this patent is extended or adjusted under 35 U.S.C. 154(b) by 0 days.

(21) Appl. No.: 09/700,646

(22) PCT Filed: May 12, 1999

(86) PCT No.: PCT/SE99/00821

§ 371 (c)(1),
(2), (4) Date: Nov. 15, 2000

(87) PCT Pub. No.: WO99/60473

PCT Pub. Date: Nov. 25, 1999

(30) Foreign Application Priority Data

May 15, 1998 (SE) .............................................. 9801719

(51) Int. Cl.$^7$ ............................ H04Q 5/22; G06F 7/12; G06F 17/60

(52) U.S. Cl. ...................... 340/10.34; 340/5.91; 705/20
(58) Field of Search ............................. 340/10.34, 5.91, 340/870.37; 705/20; 327/536

(56) References Cited

U.S. PATENT DOCUMENTS 5,491,468 A * 2/1996 Everett et al. ........... 340/10.34
5,729,695 A * 3/1998 Ahlm et al. ........... 340/825.69

* cited by examiner

*Primary Examiner*—Brian Zimmerman
*Assistant Examiner*—Clara Yang
(74) *Attorney, Agent, or Firm*—Jones Day

(57) ABSTRACT

The present invention relates to a method and device for reducing the power consumption of an electronic label (1). The label (1) comprises control means (3) for supplying a transmitter (17) with power from a charge pump (23) after a signal intended for said label (1) has been received by label receiver means (15).

8 Claims, 4 Drawing Sheets

REMOTELY CONTROLLED POWER SUPPLY IN AN ELECTRONIC LABEL

The present invention relates to a remotely controlled electronic device for displaying price information of the type according to the preamble of the independent claims.

Such remotely controlled electronic price displaying devices, called electronic labels for short, are used in supermarkets and the like to display the price and other information about the goods on the shelves of the supermarket. Such devices are known form, for example patent application WO 95/25300. This document teaches a central control unit in wireless communication via nodes with a plurality of electronic labels wherein each label is provided with a receiver to receive messages from the nodes and a transmitter to send messages to the nodes. Typical messages sent by the central control unit include price update information. The price information data transmission usually commences with a code which identifies the label or group of labels which the message is addressed to and the messages sent by the electronic labels usually merely consist of an acknowledgement of the update information.

The labels transmit infra red (IR) signals and power for these transmissions is provide by a battery in each label. The IR signals are transmitted by means of LEDs which consume a current of the order of 1.5–2 amps at a voltage of 6 volts. This corresponds to a demand of 3–4 A on a 3V power supply. The label battery which has a nominal voltage of 3 V is chosen to be small in order to reduce the size and cost of the label and is not even able to deliver a peak current of 1.5–2 A. Therefore the label is provided with a transmitter capacitor which accumulates the energy needed by the LED in order to transmit IR signal.

A problem with the prior art electronic labels is that all capacitors suffer from leakage which slowly diminishes their stored charge. In electronic labels this reduced stored charge in the transmitter capacitor leads to a reduced signal strength of the signal transmitted by the LED and can result in communication failure. In order to prevent this the electronic label must ensure that the transmitter capacitor is always properly charged. The charge in the transmitter capacitor is therefore monitored by the control means of the electronic label such as a microprocessor or application specific integrated circuit and the charge in the transmitter capacitor is topped up whenever it falls below a certain level. This leads to increased power consumption which decreases the life of the battery in the electronic label. In order to overcome this problem it is possible to use high specification capacitors with very low leakage currents. This leads to increased manufacturing costs.

A first object of the present invention is to provide an electronic label which overcomes the disadvantages of the above-mentioned prior art electronic labels.

This object is achieved by means of a device having the characteristics cited in the appended claims.

A device formed in accordance with the invention has a reduced power consumption because the transmitter capacitor is only fully charged when it is needed in order to provide the LED with energy. Therefore no energy is wasted in maintaining the capacitor at a fully charged level. Furthermore lower specification (and consequently cheaper) capacitors can be used as they are only fully charged for short periods of time, of the order of a few seconds, and hence even with large leakage currents they can retain sufficient charge to ensure reliable communications.

The invention will now be described in more detail by means of illustrative embodiments and with reference to the accompanying drawings in which.

Figure 1:
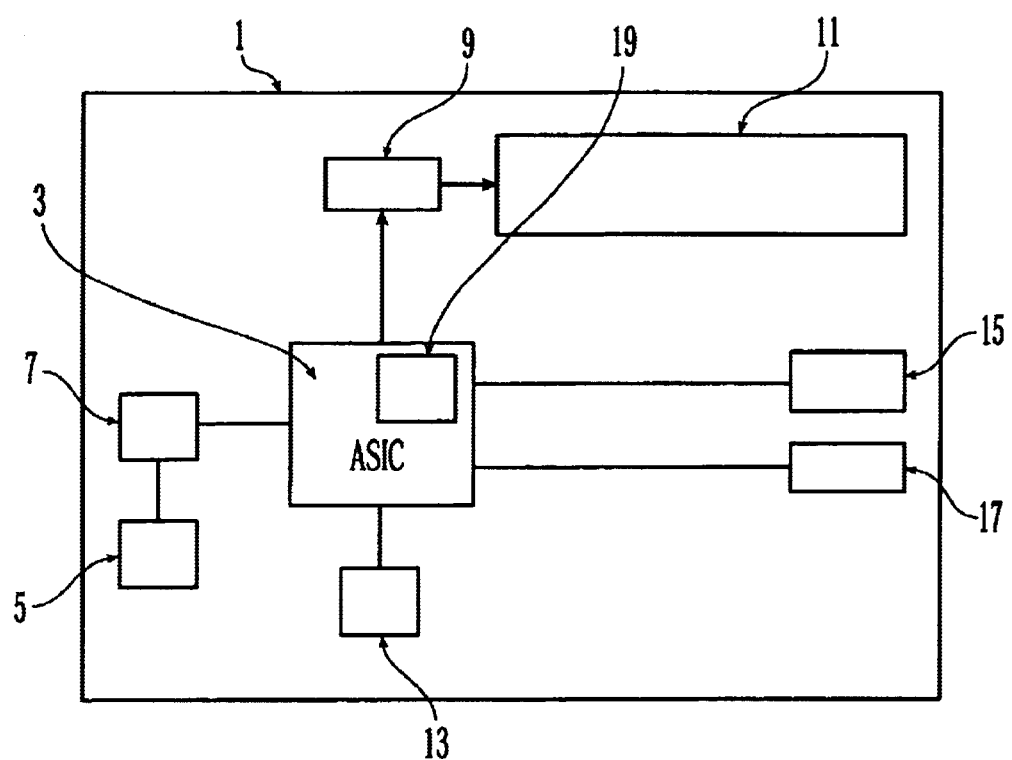
FIG. 1 shows a block diagram of an electronic label in accordance with one embodiment of the invention.

FIG. 1 shows a first embodiment of an electronic label 1 in accordance with the present invention. Label 1 comprises an application specific integrated circuit (ASIC) 3 which contains the program logic necessary to operate the electronic label 1. ASIC 3 is supplied with electrical power from a power supply such as a lithium battery 5 via a voltage regulator 7. ASIC 3 sends instruction to display driver means such as LCD driver 9 which causes information to appear on display means such as LCD display 11. ASIC 3 is also connected to a timer 13 and to receiver means such as IR-receiver 15 and transmitter means such as IR-transmitter 17. ASIC 3 has memory means such as memory 19 in which price information and the like can be stored.

Figure 2:
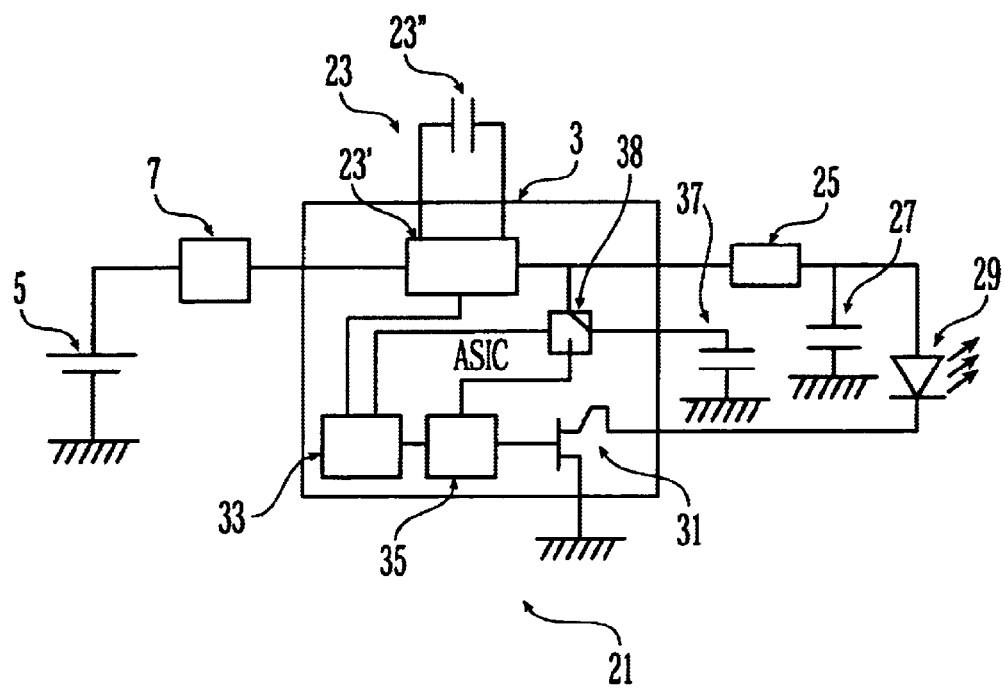
FIG. 2 shows a block diagram of a transmitter capacitor charging circuit in accordance with one embodiment of the present invention.

FIG. 2 shows an embodiment of a transmitter capacitor charging circuit 21 which is controlled by ASIC 3. ASIC contains a charge pump drive stage 23' connected to a charge pump capacitor 23" which together form a charge pump 23 which doubles the battery voltage of 3V to 6V and stores the 6V charge on charge pump capacitor 23". This charge at a voltage of 6V can be then supplied via a resistor 25 to transmitter capacitor 27. Transmitter capacitor 27 is connected to a transmitter circuit comprising the IR transmitter LED 29 and a switching means for said transmitter 29 in the form of transistor 31. ASIC 3 contains control logic 33 which controls the charge pump 23 (via charge pump drive stage 23') and a driver 35 for transistor 31. If the charge pump 23 is activated by control logic 33 and the transistor 31 is not connected to earth then current flows though resister 25 to capacitor 27. When capacitor 27 is charged the charge pump can be deactivated. When it is necessary to transmit an IR signal ASIC control logic 33 connects transistor 31 to earth and current will flow from transmitter capacitor 27 through LED 29 to transistor 31 and then to earth.

In order to activate transistor 31 driver 35 must supply the gate of transistor 31 with a voltage which is of the same order as the voltage on the drain of transistor 31, i.e. 6V. This is twice the battery voltage and can be provided by a driving capacitor 37 which can be connected via switch 38 to charge pump 23 in order to be charged up to a voltage of 6 Volts. Switch 38 is controlled by control logic 33 and can also be used to connect driver 35 to the power supply in order to control transistor 31. Transistor driver 35 can connect transistor 31 to earth thereby allowing current to flow from transmitter capacitor 27 though the LED 29 which thereby can be made to send pulses of data by suitable pulsing of transistor 31.

In order to save battery power ASIC 3 only connects the charge pump 23 to the transmitter capacitor 27 when it receives a signal which it has to acknowledge. This can be implemented by control logic 33. In order to avoid unacceptable delays in acknowledging messages the charge pump 23 can be so dimensioned that it can fully charge transmitter capacitor 27 in a short time, for example 1 or 2 seconds. If the transmission capacitor has a capacitance of 44–47 TF at 6V then the charging current required from the battery 5 at 3V to charge the transmitter capacitor 27 in 1–2 seconds will be of the order of 250–800 TA depending on the efficiency of the charging process. This low current can be easily supplied by a small lithium battery such as a CR 2032 battery. Thus if a node sends out a signal intended to, for example, change the price information on a label then the node transmits a message containing the address of that label. When that label receives any messages from a node containing its own address, its control logic 33 can immediately command the charge pump 23 to start charging transmitter capacitor 27 in order that the label can quickly transmit a reply if it becomes necessary. If the control logic 33 determines that the received message does not require a reply then control logic 33 commands the charge pump 23 to stop charging transmitter capacitor 27. If the received message requires a reply then the energy stored in transmitter capacitor 27 can be used in the normal way to power LED 29. If the charge on transmitter capacitor 27 becomes depleted during the course of communication between the label and a node then the charge pump is activated to top up the charge on transmitter capacitor 27. This is continued until the final message in a communication is transmitted by the label. The charge on transmitter capacitor 27 can then be retained for a predetermined amount of time so that in the event of a new message being received it is ready to reply or it can be discharged to earth without activating LED 29.

Figure 3:
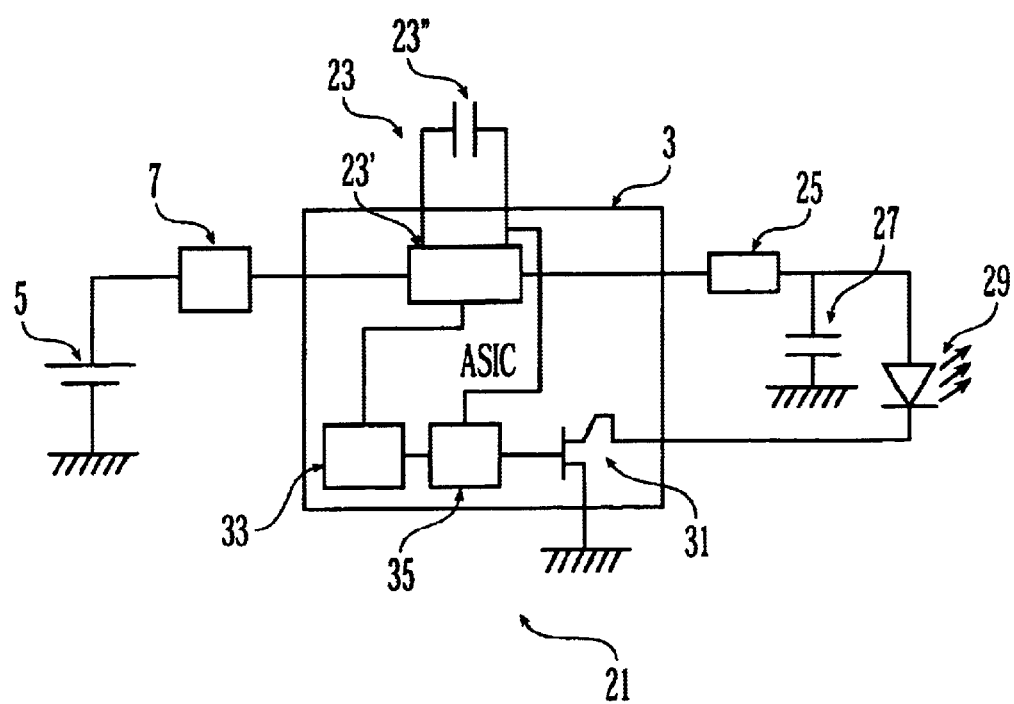
FIG. 3 shows a block diagram of a transmitter capacitor charging circuit in accordance with a second embodiment of the present invention.

In a second embodiment of the invention as shown in FIG. 3 the use of a driving capacitor 37 can be eliminated in order to reduce the number of components required. The driving capacitor can be eliminated by directly using charge pump capacitor 23" to supply a 6V current to transistor 31. Tis requires that after being discharged in order to fully charge transmitter capacitor 27, as explained above with reference to the first embodiment of the invention, the charge pump capacitor 23" is recharged to 6V and held at this voltage while communications are being made between the label 1 and control node(s) in case it becomes necessary to activate switching transistor 31. This can be accomplished by amending the control logic 33 which can be made to hold charge pump capacitor at the desired voltage level for a predetermined period of time or until communication between the label and node has finished and connecting driver 35 to charge pump capacitor 23".

Figure 4:
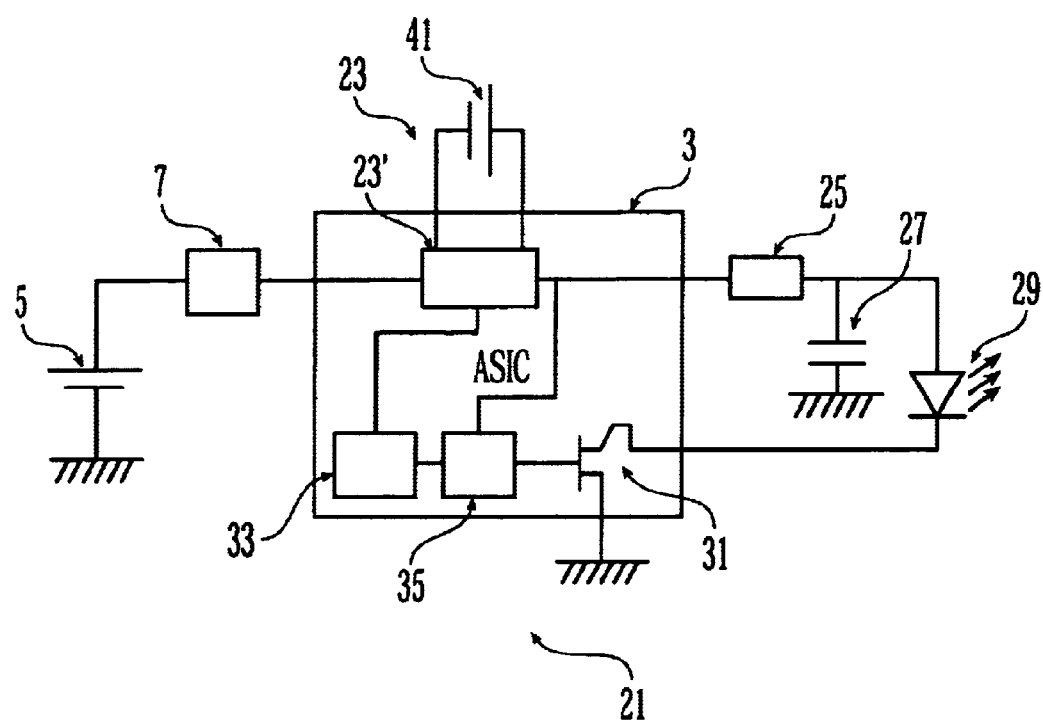
FIG. 4 shows a block diagram of a transmitter capacitor charging circuit in accordance with a third embodiment of the present invention.

In a third embodiment of the invention shown in FIG. 4 the charge pump capacitor can be replaced by an additional power supply such as battery 41. This battery can be used as a 3V power supply in parallel with battery 5 when the label 1 is in normal use i.e. on stand-by or when displaying information. This extends the operating life of the label, the actual amount of extended life being determined by the size of battery 41. If battery 41 is identical to battery 5 then the life of the label 1 will be doubled. When the label has to transmit a signal and therefore needs a 6V power supply, batteries 5 and 41 can be connected in series to produce a 6V voltage which can be used to charge transmitter capacitor 27. This switching can be performed by the drive stage 23' of charge pump 23 under the control of control logic 33. While this embodiment has been illustrated by the use of an extra 3V battery having the same size as the normally present battery it is of course possible to use a plurality of extra batteries of any convenient size in order to achieve the desired result.

Although this improvement is shown implemented in connection with the embodiment of the invention shown in FIG. 3 it is of course possible to implement it on the embodiment of the invention shown in FIG. 2.

In all the embodiments of the present invention, if a delay in replying to messages can be accepted then when a signal addressed to the label is received the charging of the transmitter capacitor 27 can be delayed until enough of the message has to received to enable the control logic 33 to decide if a reply is needed or not. In a first case the message could use a part, or all of, the address of the labels being communicated to in a header or protocol and only labels mentioned in the header or protocol will react to the message. Non-addressed labels could deactivate their receivers for a pre-programmed period of time or a period of time mentioned in the message in order to reduce their power consumption while the communication is taking place with the labels mentioned in the message. If a reply will be needed then control logic 33 can command charge pump 23 to charge up the transmitter capacitor 27 on the addressed labels. If the message received is such that no reply is needed then the addressed labels execute the command but their transmitter capacitors 27 are left uncharged and therefore no energy is wasted in unnecessarily charging up transmitter capacitors 27.

The invention is not intended to limited to the embodiments described above but can be modified within the scope of the accompanying claims.

What is claimed is:

1. A method for controlling the use of power in an electronic label comprising a power supply means, transmitter means, switching means for said transmitter means, receiver means, charge pump means for producing a current at a voltage which is greater than a voltage of said power supply, control means for selectively connecting said charge pump means to a transmitter capacitor, whereby said transmitter capacitor is connectable to said transmitter means in order to supply said transmitter means with power at a voltage which is greater than the voltage of said power supply, comprising the step of supplying said transmitter capacitor with power from said charge pump after a signal intended for said label has been received by said receiver means, wherein the control means breaks the connection between said charge pump means and said transmitter capacitor if no transmission is to take place.

2. The method according to claim 1, comprising the step of said switching means being supplied with power from said charge pump at a voltage which is greater than the voltage of said power supply.

3. The method according to claim 1, comprising the step of said transmitter capacitor being supplied with power from said charge pump for a predetermined period of time or until a final message in a communication has been transmitted by said transmitting means.

4. The method according to claim 3, comprising the step of said switching means being supplied with power from said charge pump at a voltage which is greater than the voltage of said power supply.

5. An electronic label comprising a power supply, receiver means, transmitter means, switching means, charge pump means, further comprising an additional power supply, for producing a current at a voltage which is greater than the voltage of said power supply, control means for selectively connecting said charge pump means to a transmitter capacitor, whereby said transmitter capacitor is connectable to said transmitter means in order to supply said transmitter means with power at a voltage which is greater than the voltage of said power supply, wherein said control means comprises control logic means which determine if a received signal requires a reply to be transmitted and which connect said charge pump means to said transmitter capacitor if a reply is required.

6. An electronic label in accordance with claim 5, wherein said switching means is connectable to said charge pump in order to be supplied with a voltage which is greater than the voltage of said power supply.

7. A method for controlling the use of power in an electronic label comprising transmitter means, a transmitter capacitor, charge pump means, control means for connecting said charge pump means to said transmitter capacitor, whereby said transmitter capacitor is connectable to said transmitter means, the method comprising: said control means determining when it is likely that the label will need to transmit and subsequently, as a response, connecting said charge pump means to said transmitter capacitor, wherein the control means breaks the connection between said charge pump means and said transmitter capacitor if no transmission is to take place.

8. An electronic label comprising transmitter means, a transmitter capacitor, charge pump means, control means for connecting said charge pump means to said transmitter capacitor, whereby said transmitter capacitor is connectable to said transmitter means, wherein said control means determines when it is likely that the label will need to transmit and subsequently, as a response, connects said charge pump means to said transmitter capacitor, wherein the control means breaks the connection between said charge pump means and said transmitter capacitor if no transmission is to take place.

* * * * *